United States Patent
Goldstein (10) Patent No.: US 7,188,087 B1
(45) Date of Patent: Mar. 6, 2007

(54) DEVICES, SYSTEMS AND METHODS FOR RESTRICTING USE OF DIGITAL CONTENT

(75) Inventor: Tim Goldstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/570,193

(22) Filed: May 15, 2000

(51) Int. Cl.
*G06Q 99/00* (2006.01)
*H04K 1/00* (2006.01)
*H04L 9/00* (2006.01)

(52) U.S. Cl. .................. 705/57; 705/51; 705/52; 705/53; 705/54; 705/55; 705/56; 705/58; 705/59; 341/61; 341/126; 341/143; 341/158

(58) Field of Classification Search ............ 705/50–59, 705/60; 341/61, 126, 143, 155; 386/46, 386/84, 94, 95
See application file for complete search history.

(56) References Cited

U.S. PATENT DOCUMENTS

| | | | | |
|---|---|---|---|---|
| 4,858,036 A | * | 8/1989 | Ginkel | 360/60 |
| 4,980,782 A | * | 12/1990 | Ginkel | 360/60 |
| 5,379,433 A | * | 1/1995 | Yamagishi | 705/56 |
| 5,923,486 A | * | 7/1999 | Sugiyama et al. | 360/60 |
| 6,034,832 A | * | 3/2000 | Ichimura et al. | 705/57 |
| 6,289,102 B1 | * | 9/2001 | Ueda et al. | 380/201 |
| 6,425,098 B1 | * | 7/2002 | Sinquin et al. | 705/57 |
| 6,437,933 B1 | * | 8/2002 | Sugiyama et al. | 360/69 |
| 6,453,118 B2 | * | 9/2002 | Sugita et al. | 386/94 |
| 6,545,965 B1 | * | 4/2003 | Hayashi | 369/59.12 |
| 6,615,192 B1 | * | 9/2003 | Tagawa et al. | 705/57 |
| 6,687,802 B1 | * | 2/2004 | Kori et al. | 360/60 |
| 6,691,229 B1 | * | 2/2004 | Nelson | 713/193 |
| 6,781,935 B1 | * | 8/2004 | Kori et al. | 369/53.34 |
| 6,782,190 B1 | * | 8/2004 | Morito | 386/94 |
| 2001/0004736 A1 | * | 6/2001 | Hirano et al. | 705/51 |
| 2001/0017828 A1 | * | 8/2001 | Yamada | 369/47.12 |

FOREIGN PATENT DOCUMENTS

WO    WO 97/43853    * 11/1997

OTHER PUBLICATIONS

Lochner in cyberspace: The new economic orthodoxy of "rights management", Cohen, Julie E; Michigan Law Review, v97n2, pp. 462-564, Nov. 1998.*
Borland Licenses Macrovision's SafeDisc HD CD-ROM Copy Protection Technology on Worldwide Basis; Business Wire, p. 0427, Feb. 14, 2001.*
Audio Home Recording Act of 1992, Pub.L. No. 102-563, 106 Stat. 4237 (codified at 17 U.S.C. § 1001-1010).
Digital Millennium Copyright Act ("DMCA"), Pub.L. No. 105-304, 112 Stat. 2860 (codified at 17 U.S.C. § 1201 et seq.).

* cited by examiner

*Primary Examiner*—Andrew J. Fischer
*Assistant Examiner*—Cristina Owen Sherr (57) ABSTRACT

Devices, systems and methods for restricting use of digital content are provided. Among those embodiments which may be construed as providing a method for restricting use of digital data, a preferred method includes the steps of: enabling a user to receive digital data; and preventing the user from copying the digital data to a digital data recording medium if: (a) copy information corresponding to the digital data indicates that such copying is not to be permitted; or (b) the digital data recording medium is not an authorized digital data recording medium.

42 Claims, 3 Drawing Sheets

DEVICES, SYSTEMS AND METHODS FOR RESTRICTING USE OF DIGITAL CONTENT

BACKGROUND OF THE INVENTION

1. Field of the Invention

The present invention generally relates to devices, systems and methods for restricting use of digital content and, in particular, to devices, systems and methods for ensuring compliance of digital audio and/or digital video data recordings with copyright protection formats.

2. Description of the Related Art

The proliferation of the Internet and highly transportable storage media, such as Compact discs (CD's), Digital Versatile Discs (DVD's), and Digital Audio Tape (DAT), for example, have made the worldwide dissemination and storage of digital data common place. Such digital data, however, may embody a work or compilation of works which may be the subject of one or more copyrights. Heretofore, digital data relating to the subject of one or more copyrights oftentimes has been copied in disregard of such copyrights.

Due to the prevalence of unauthorized copying of copyrighted works onto storage media, such as CD's, for example, legislation such as the Audio Home Recording Act of 1992, the Digital Millennium Copyright Act (DMCA), the Secure Digital Music Initiative (SDMI), and the Secondary Copy Management System (SCMS), among others, have been enacted in order to avert such unauthorized copying. Even with such legislation, however, unauthorized copying of copyrighted or, otherwise, proprietary digital data still occurs, resulting in a significant loss of potential royalties which should be paid to the owners of the digital data.

Therefore, there is a need for improved devices, systems and methods which address these and other shortcomings of the prior art.

SUMMARY OF THE INVENTION

Briefly described, the present invention generally relates to devices, systems and methods for restricting use of digital content and, in particular, to devices, systems and methods for ensuring compliance of digital audio and/or digital video data recordings with copyright protection formats. Among those embodiments which may be construed as providing a method for restricting use of digital data, a preferred method includes the steps of: enabling a user to receive digital data; and preventing the user from copying the digital data to a digital data recording medium if: (a) copy information corresponding to the digital data indicates that such copying is not to be permitted; or (b) the digital data recording medium is not an authorized digital data recording medium.

An alternative method includes the steps of: receiving digital data; and determining whether the digital data is being received from a digital data recording medium (DDRM). If the digital data is being received from a DDRM, the step of determining whether the DDRM is a second generation DDRM is conducted, and then, if the DDRM is a second generation DDRM, enabling the digital data to be played.

Another alternative method includes the steps of: enabling a user to receive digital data; and enabling a determination to be made as to whether the digital data being received by the user is from a DDRM. If the digital data is being received from a DDRM, the step of enabling a determination to be made as to whether the DDRM is a second generation DDRM is conducted, and then, if the DDRM is a second generation DDRM, enabling the digital data to be played by the user.

A preferred embodiment of a device for restricting use of digital data by a user includes a first input configured to receive digital data, a second input configured to receive inputs from a user, and a recording media interface component configured to communicate with a digital recording medium. Preferably, the recording media interface electrically communicating with the first input and the second input and is adapted to write data to a digital recording medium. Additionally, the device is configured to determine whether digital data received via the first input is from a digital data recording medium (DDRM) and, if the digital data is from a DDRM, to determine whether the DDRM is a second generation DDRM so that, if the DDRM is a second generation DDRM, the device plays the digital data in response to an associated input provided via the second input from the user.

In another embodiment, a device for restricting use of digital data by a user includes: means for receiving digital data; means for receiving inputs from a user; means for writing data to a digital recording medium; means for determining whether digital data received via said means for receiving digital data is from a digital data recording medium (DDRM); and means for determining whether the DDRM is a second generation DDRM so that, if the DDRM is a second generation DDRM, the device plays the digital data in response to an associated input provided via said means for receiving inputs from a user from the user.

A preferred system includes a first input configured to receive digital data and a memory storage device communicating with the first input. A processor also is provided an is configured to determine whether the digital data received via the first input is from a digital data recording medium (DDRM) and, if the digital data is from a DDRM, to determine whether the DDRM is a second generation DDRM. A second input is configured to receive inputs from a user and a recording media interface is provided which is configured to communicate with a digital recording medium so that if it is determined that the digital data received via the first input is from a DDRM and that the DDRM is a second generation DDRM, the system enables playing of the digital data in response to an associated input provided via the second input from the user.

In still another embodiment, a computer readable medium is provided which includes a computer program stored therein for interfacing with a processor-based system. The computer readable medium preferably includes: logic configured to determine whether the digital data is being received from a digital data recording medium (DDRM); logic configured to determine whether the DDRM is a second generation DDRM; and logic configured to enable playing of the digital data if the digital data is being received from a second generation DDRM.

Other features and advantages of the present invention should become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Reference will now be made in detail to the description of the invention as illustrated in the drawings with like numerals indicating like parts throughout the several views. As mentioned briefly hereinbefore, the present invention provides devices, systems and methods for restricting use of digital data or digital content and, in particular, to devices, systems and methods for ensuring compliance of digital audio and/or digital video data recordings with copyright protection formats. Such formats may include, but are not limited to, the Secure Digital Music Initiative (SDMI) and the Secondary Copy Management System (SCMS) formats, among others.

In regard to SDMI, this format is intended to enable the honoring of copyrights of works embodied in digital data, such as by utilizing one or more coding formats and/or techniques for identifying and/or protecting the works.

In regard to SCMS, this format specifies that a recording medium contains SCMS information which is stored in the sub-code information of the medium. In accordance with the SCMS specification, the SCMS information enables a user to make a single recording of the digital information stored on the medium. It should also be noted that for a medium to be considered in compliance with the SCMS specification, royalties have been paid on the medium.

The present invention, referred to hereinafter as the "compliance device," "device," "compliance system," "system," "compliance method," and/or "method," is adapted to ensure that users comply with copyright protection formats (such as those mentioned herein, among others) and may be implemented in hardware, software, firmware, or a combination thereof. In a preferred embodiment, however, the compliance system is implemented as a software package, which can be adaptable to run on different platforms and operating systems as shall be described further herein. In particular, a preferred embodiment of the compliance system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device.

The computer readable medium can be, for example, but is not limited to, an electronic, magnetic, optical, electromagnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 1:
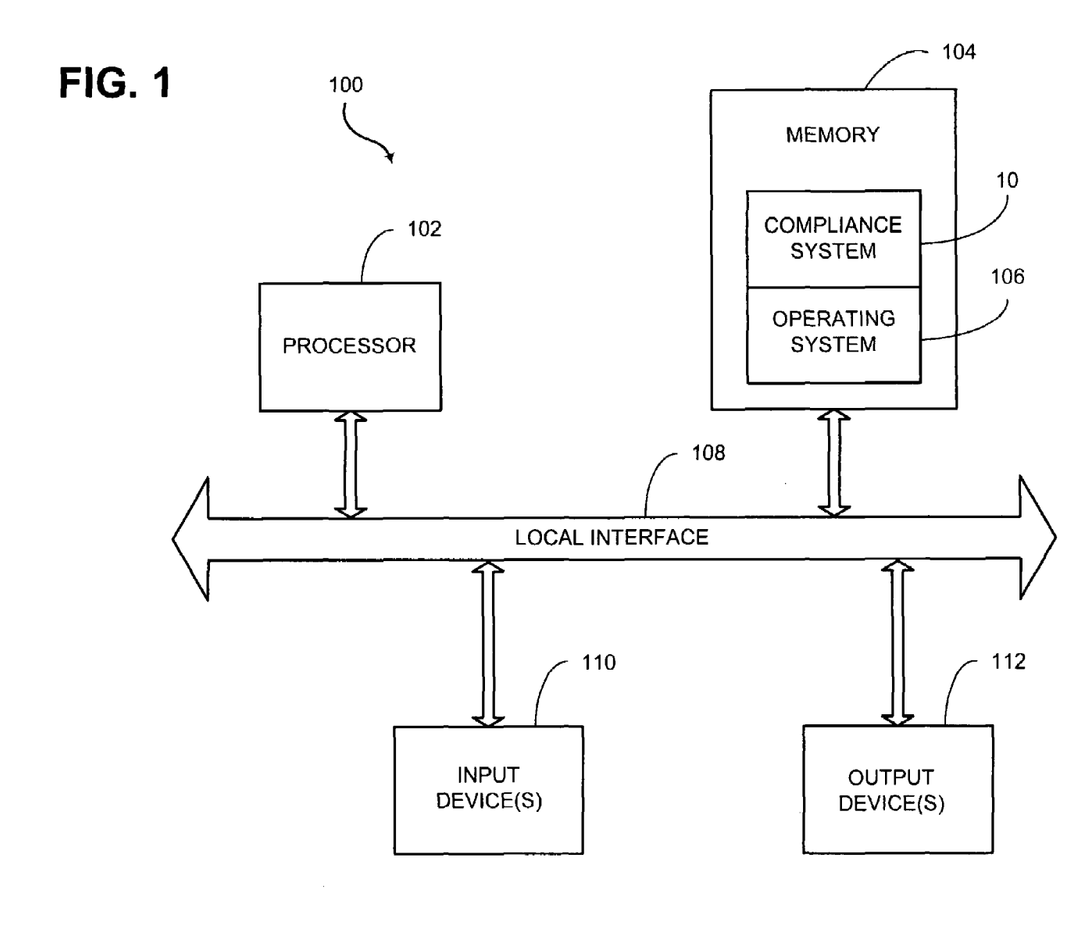
FIG. 1 is a block diagram depicting a representative processor-based system which may be utilized with the present invention.

FIG. 1 illustrates a typical computer or processor-based system 100 which may utilize the compliance system 10 of the present invention. As shown in FIG. 1, a computer system 100 generally comprises a processor 102 and a memory 104 with an operating system 106. Herein, the memory 104 may be any combination of volatile and nonvolatile memory elements, such as random access memory or read only memory. The processor 102 accepts instructions and data from memory 104 over a local interface 108, such as a bus(es). The system also includes an input device(s) 110 and an output device(s) 112. Examples of input devices may include, but are not limited to, a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The compliance system 100 of the present invention, the functions of which shall be described hereinafter, resides in memory 104 and is executed by the processor 102.

Figure 2:
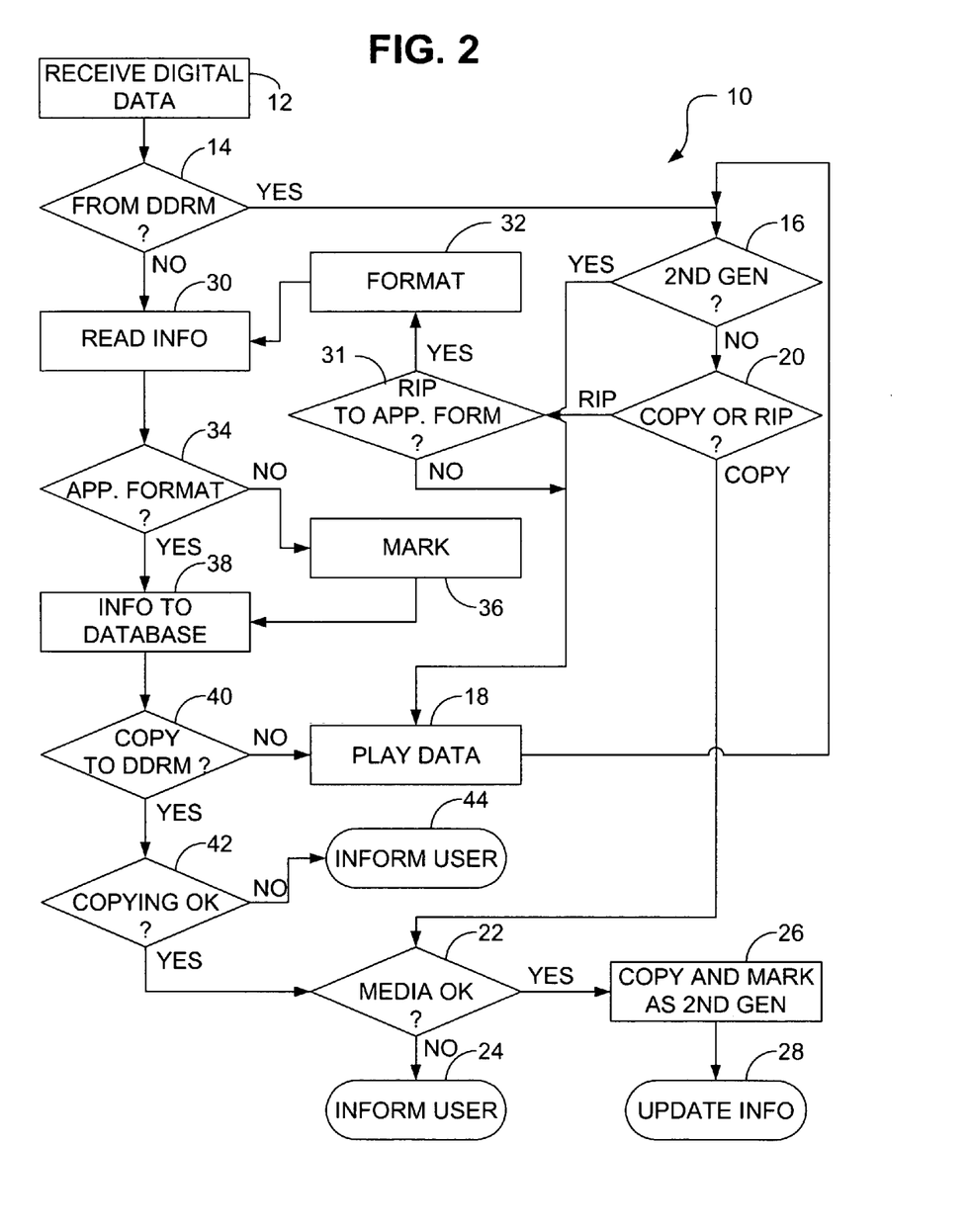
FIG. 2 is a flow chart depicting a functional representation of a preferred embodiment of the present invention.

The flowchart of FIG. 2 shows the functionality and operation of a preferred implementation of the compliance system 10 depicted in FIG. 1. In this regard, each block of the flow chart represents a module segment or portion of code which comprises one or more executable instructions for implementing the specified logical function or functions. It should also be noted that in some alternative implementations the functions noted in the various blocks may occur out of the order depicted in FIG. 2. For example, two blocks shown in succession in FIG. 2 may in fact be executed substantially concurrently where the blocks may sometimes be executed in the reverse order depending upon the functionality involved.

In the embodiment of the compliance system 10 depicted in FIG. 2, the process preferably begins at block 12 where digital data, e.g., digital audio data, digital video data and/or digital audio and video data, is received from a source, such as the Internet, a digital data recording medium, etc. As utilized herein, the term "digital data recording medium" or DDRM refers to a medium or device which is capable of storing digital data, such as a CD, a DVD, a Digital Audio Tape (DAT), among others. For ease of description, and not for the purpose of limitation, some illustrative examples provided herein in regard to the present invention will refer to the use of CD's. However, it should be noted that the present invention may utilize any suitable digital data recording medium, with all such uses considered well within the scope of the present invention.

Proceeding to block 14, a determination is made as to whether the digital data is being received from a DDRM. If it is determined that the digital data is from a DDRM, the process preferably proceeds to block 16 where a determination is made as to whether the DDRM is a second generation DDRM. As utilized herein, the term "second generation" refers to a DDRM which contains digital data that is copied from an original source or authorized release copy of such digital data. If it is determined in block 16 that the digital data being received is from a second generation DDRM, the method preferably proceeds to block 18 where the digital data may be played, e.g., played as audio and/or video. If, however, it is determined in block 16 that the digital data is not being received from a second generation DDRM, the method may then proceed to block 20 where a determination is made as to whether the digital data is to be copied or ripped. If it is determined that the digital data is to be copied, the method preferably proceeds to block 22 where a determination is made as to whether a user has provided an authorized DDRM, such as SCMS media, for example, for copying the digital data thereon. As utilized herein, the term "authorized DDRM" refers to DDRM which is suitable for copying digital data thereto and which has been approved for such copying (typically, being approved for copying means that an appropriate royalty corresponding to the medium has been paid).

If it is determined that the user has not provided an authorized DDRM, the method preferably proceeds to block 24 where the user is prevented from making the desired copy and preferably is informed, such as by a prompt or indicator, of the inability to make such a copy. If, however, it is determined that the user has provided such an authorized DDRM, the method preferably proceeds to block 26 where the digital data may be copied to the authorized DDRM, e.g., the audio track may be burned to CD, with the CD preferably being marked as a second generation. Additionally, information, such as watermark and tag information, preferably is updated in a master file, such as depicted in block 28.

Referring back to block 14, if it is determined that the digital data is not being provided from a DDRM, the process preferably proceeds to block 30 where digital rights management information or copy information relating to the digital data or content stored thereon is read. As utilized herein, the term "copy information" refers to information (e.g., information regarding copyright, payment of royalties during download, etc.) regarding the authorization of a user to copy the digital data and may include watermarks, tags, codes, encryption information and/or other features. The process also returns to block 30 when a determination has been made (in block 20) that digital data from a non-second generation DDRM is to be ripped and when a subsequent determination has been made that the data is to be converted to an appropriate format, e.g. a format conducive to presenting and/or maintaining copy information, such as SDMI format, for example (block 31). Conversion to an appropriate format (block 32) also may include marking the data as a "home copy." As utilized herein, the term "home copy" refers to a coding which facilitates a secure formatting of the digital data associated therewith. For instance, when marked as a "home copy," the digital data so marked may be restricted for play on the device which was utilized to facilitated the reception of the data and/or copying of the data to a DDRM, thereby transforming the DDRM so marked into a secure medium. If it is determined that the digital data is not to be converted to an appropriate format, the process may return to block 18 where the digital data may be played.

Referring again to block 30, after reading the copy information, the method may proceed to block 34 where a determination is made as to whether the information is provided in an appropriate format, such as SDMI format. If it is determined that the information is not in an appropriate format, the method preferably proceeds to block 36 where the information is marked as a "home copy," and watermarked (if the digital data is not compressed).

If it determined that the information is in an appropriate format or, alternatively, after the information has been appropriately marked (block 36), the method preferably proceeds to block 38 where an appropriate tag and watermark are placed in a database. Proceeding to block 40, a determination then is made as to whether the digital data is to be copied. If it is determined that the data is not to be copied, the method may proceed to block 18 where the digital data may be played, as described hereinbefore. If, however, it is determined that the digital data is to be copied, the method preferably proceeds to block 42 where a subsequent determination is made as to whether such copying is authorized. If copying is not authorized, the method preferably proceeds to block 44 where the user is so informed. If, however, it is determined that the digital data is authorized to be copied, the method preferably proceeds to block 22 and then proceeds as described hereinbefore.

As described hereinbefore, the present invention enables a user to download content from the Internet, for example, while ensuring that such download is in compliance with one or more compliance specifications, e.g., SDMI and/or SCMS. For instance, by utilizing the present invention, preferably only content authorized to be copied (fully compliant content) and/or content which should be fully compliant when appropriately purchased (and, thus, royalty is paid) by a user may be copied. The following are representative examples of content which the present invention may facilitate for downloading: Liquid Tracks from Liquid Audio with watermarking and encryption; genuine MP3 from Liquid Audio with watermarking; ASFS from AudioSoft with watermarking and encryption; legal MP3 with watermarking; MSaudio4 from Microsoft with watermarking and encryption; A2B from AT&T with watermarking and encryption; AAC from Dolby Laboratories with watermarking and encryption; and file types with SDMI approval, among others.

As described hereinbefore in relation to FIG. 2, receiving digital data, such as by downloading a file from an Internet website, that does not have watermarking or encryption, the present invention facilitates watermarking of the file and tagging of the file as a "home copy." If, thereafter, the user wishes to burn the track to CD, the user must either pay an appropriate royalty, as indicated at the web site, or utilize authorized DDRM, e.g., SCMS media, as described hereinbefore. Thus, copy protection through encryption and watermarking preferably is strictly followed, whereby if a download file does not have the appropriate encryption and/or watermarking, but is in a format that should have this information, the file preferably is watermarked and/or encrypted as uncopyable until such time as either the royalty is paid or authorized DDRM is utilized.

As another example, when a user has created a WAV file and has stored the file, such as on the hard drive of a personal computer, the present invention may facilitate conversion of this file into an appropriate format and watermark and/or encrypt the file with the user's identification information and mark the file as "home copy."

When a user copies audio from a CD, preferably the information should be provided in one of the formats recited hereinbefore. The copied track is watermarked and/or encrypted with the user's information, with the track also being marked as a "home copy." If, thereafter, the user intends to burn any track from a CD to another CD, the user is required to purchase a license from an appropriate website or use SCMS media. Additionally, CD's marked as "second generation" maybe copied to a system of the user; however, all tracks so copied are watermarked as uncopyable. Thus, the files created from second generation CD's may not be copied to another CD. For instance, when a user inserts an audio CD bought from a local music store and then copies selected tracks from the CD to the user's hard drive and creates a compilation list from these tracks to burn to CD, the present invention preferably prompts the user to utilize authorized DDRM. As a further example, when a user inserts an audio CD which was produced on a CD copier, the present invention preferably notifies the user that the CD is a second generation CD. If, thereafter, the tracks on the CD are copied to the hard drive and the user attempts to add these to a compilation to burn to CD, the user preferably is informed that burning of those tracks is not allowed.

Preferably, all tracks burned to CD from another CD include serial copy management information (SCMI) added to a lead-in of the CD and the lead-in of the track which marks the track as a second generation. This SCMI information states that the CD created is a copy and that each track should be marked as uncopyable. Thus, when a user copies a track from CD to a hard drive in an appropriate format, such as a format set forth hereinbefore, and the user then creates a track list from CD's to be burned to CD, the present invention preferably prompts the user to utilize SCMS media. The user also should receive a similar prompt when attempting to create a track list which includes one or more files from another CD as well as files that have had royalties paid when downloaded. If, however, the user has appropriately downloaded tracks, i.e., has paid the appropriate royalties for all files downloaded, and the user then creates a compilation list to burn to CD of these files, the user should not be prompted by the present invention to provide SCMS media. The files burned to the CD should then have the appropriate SCMI information decremented to reflect the appropriate burn count and, thus, the ability of the user to make further copies.

The present invention also may facilitate direct CD-to-CD copying if such copying is to made to authorized DDRM. When such copying is facilitated, each track should be appropriately marked as second generation, such as by alternating the copy bit from one to zero in the data portion of the disk for each track. Although second generation tracks may be played through an analog audio port, the present invention preferably does not facilitate the copying of any second generation track regardless of the media type utilized to be copied.

The present invention also may facilitate the collection of audio from other digital sources; however, authorized copy rules, such as SCMS rules, for example, are followed. Therefore, if the copyright status bit of the digital data is set for copy protected and the L bit is set for pre-rec, the file should be watermarked as a "home copy." If this track is burned to CD, the copy bit should be modified from zero to one to indicate second generation. If the copy status bit is set for copy protected and the L bit is missing, recording and copying is prohibited. Additionally, audio from analog sources should be watermarked as "home copy" and can be burned to CD using SCMS or commercial media.

Figure 3:
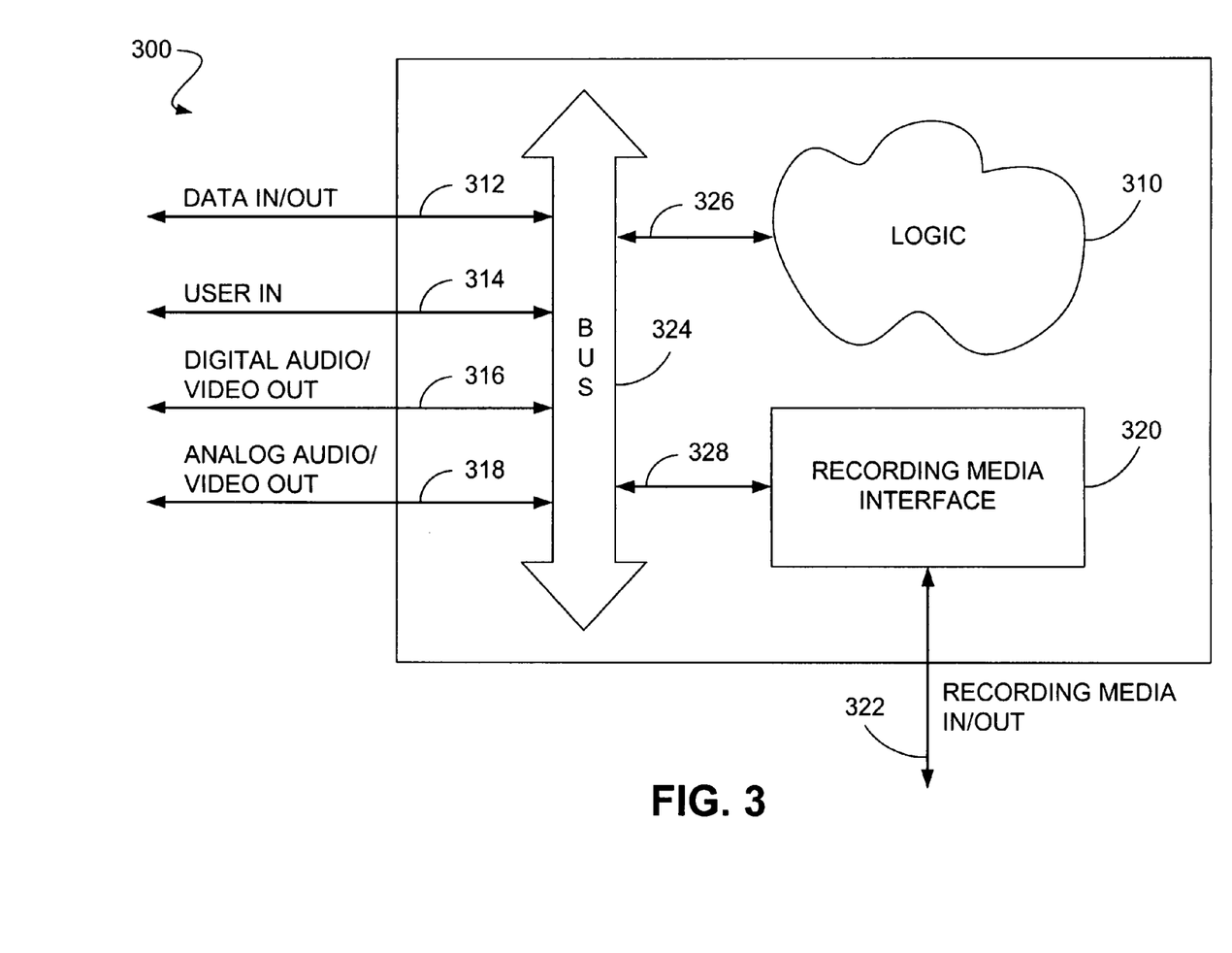
FIG. 3 is a schematic diagram depicting a preferred embodiment of the present invention.

Referring now to FIG. 3, a preferred embodiment of a compliance device 300 will be described in detail. For the purpose of illustration, and not for the purpose of limitation, the device 300 is described herein as a stand-alone unit, i.e., a unit not requiring an interface with a processor-based device, such as a personal computer, for example. However, various functionality described in relation to the device 300 may be appropriately accommodated by such an interface, whereby the various components described herein for providing particular functionality of device 300 may, instead, be providing by such a processor-based system. Thus, alternative embodiments of the device 300 may include only those components which provide functionality typically not provided in such a processor-based system. All such embodiments, although not described in detail herein, are considered well within the scope of the present invention.

In regard to FIG. 3, compliance device 300 includes functional logic 310 which may be provided in numerous configurations, such as in hardware, firmware, software, or combinations thereof. Preferably, functional logic 310 enables functionality of the device, such as described in relation to the process 200 depicted in FIG. 2, for example. Device 300 also incorporates various inputs and outputs, such as a data input 312 which may be adapted for interfacing with the Internet, Ethernet, or another suitable network, or may be adapted to receive data from a processor of a processor-based system, such as a personal computer, for example. A user input 314 is provided for allowing a user to interface with the device, with such user input cooperating with one or more keys of a key pad, a computer-interfaced keyboard, or any other suitable configuration which allows a user to select among the various functionality provided by the device 300 (described in detail hereinafter). A digital audio/video output 316 is provided which is adapted for providing audio/video data to a device, such as a speaker or display device, for converting the digital data stored on a digital storage medium. Additionally, an analog audio/video output 318 may be provided which is adapted for providing audio/video data to a device, such as a speaker or display device. It should be noted that, in some embodiments, the functionality provided by data in/out 312 and digital audio/video out 316 may be accommodated by a single input/output. Compliance device 300 also incorporates a media reader/writer 320 which is adapted to receive a digital recording media, such as a CD, or DVD, via recording media input/output 322 and, thereafter, is adapted to read data from and/or write data to the medium received therein.

As depicted in FIG. 3, the various components of device 300 may electrically intercommunicate via a bus, i.e., bus 324, with logic 310 and reader/writer 320 communicating with the bus 324 via transmission lines 326 and 328, respectively, although various other intercommunication layouts, such as those layouts incorporating infra-red (IR), radio frequency (RF) and or satellite intercommunication techniques, may be utilized. So provided, compliance device 300 may provide various compliance functionality, such as the compliance functionality described in relation to FIG. 2, for example.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method for restricting use of digital data comprising:
receiving digital data;
determining whether the digital data is being received from a digital data recording medium (DDRM); and
if the digital data is being received from a DDRM, determining whether the DDRM is a second generation DDRM, which includes digital data copied from at least one of an original source and an authorized copy of such digital data such that:
if the DDRM is a second generation DDRM and the digital data is to be played, enabling the digital data to be played; and
if the DDRM is a second generation DDRM and the digital data is to be copied:
determining whether an authorized recording medium, for which copying digital data thereto has been approved, is provided for copying the digital data thereon;
if an authorized recording medium is not provided, preventing copying of the digital data; and
if an authorized recording medium is provided, enabling copying of the digital data onto the authorized recording medium.

2. The method of claim 1, wherein determining whether the digital data is being received from a DDRM comprises:
if the digital data is not being received from a second generation DDRM, determining whether the digital data is to be copied or ripped;
if the digital data is to be copied, determining whether an authorized recording medium is provided for copying the digital data thereon;
if an authorized recording medium is not provided, preventing copying of the digital data;
if an authorized recording medium is provided, enabling copying of the digital data onto the authorized recording medium.

3. The method of claim 1, wherein determining whether the digital data is being received from a DDRM comprises:
if the digital data is not being received from a DDRM, reading identification information of the digital data.

4. The method of claim 1, wherein receiving digital data comprises receiving digital data via the Internet.

5. The method of claim 1, wherein the digital data comprises audio data, and wherein enabling the digital data to be played comprises enabling the digital data to be played as audio.

6. The method of claim 2, wherein preventing copying of the digital data comprises informing a user that the digital data may not be copied.

7. The method of claim 2, wherein enabling copying of the digital data onto the authorized recording medium comprises marking the authorized recording medium with the digital data recorded thereon as a second generation.

8. The method of claim 2, further comprising updating watermark and tag information of the digital data.

9. The method of claim 2, wherein determining whether the digital data is to be copied or ripped comprises:
if the digital data is to be ripped, marking the digital data as a home copy; and
reading identification information of the digital data.

10. The method of claim 3, wherein identification information is selected from at least one of the group consisting of: watermark information, tag information and encryption information.

11. The method of claim 3, wherein reading identification information comprises:
determining whether the identification information is provided in an appropriate format;
if the identification information is not in an appropriate format, marking the digital data as a home copy;
if the identification information is in an appropriate format, placing a tag and watermark in a database.

12. The method of claim 9, wherein an appropriate format is SDMI format, and wherein marking the digital data as a home copy comprises the step of converting the rip tag file to SDMI format.

13. A method for restricting use of digital data comprising:
enabling a user to receive digital data;
enabling a determination to be made as to whether the digital data being received by the user is from a DDRM; and
if the digital data is being received from a DDRM, enabling a determination to be made as to whether the DDRM is a second generation DDRM, which includes digital data copied from at least one of an original source and an authorized copy of such digital data such that:
if the DDRM is a second generation DDRM and the digital data is to be played, enabling the digital data to be played by the user; and
if the DDRM is a second generation DDRM and the digital data is to be copied:
determining whether an authorized recording medium, for which copying digital data thereto has been approved, is provided for copying the digital data thereon;
if an authorized recording medium is not provided, preventing copying of the digital data; and
if an authorized recording medium is provided, enabling copying of the digital data onto the authorized recording medium.

14. The method of claim 13, wherein enabling a determination to be made as to whether the digital data being received by the user is from a DDRM comprises:
if the digital data is not being received from a second generation DDRM, enabling a determination to be made as to whether the digital data is to be copied or ripped;
if the digital data is to be copied, enabling a determination to be made as to whether an authorized recording medium is provided for copying the digital data thereon;
if an authorized recording medium is not provided, preventing copying of the digital data;
if an authorized recording medium is provided, enabling copying of the digital data onto the authorized recording medium.

15. The method of claim 13, wherein enabling a determination to be made as to whether the digital data being received by a user is from a DDRM comprises:
if the digital data is not being received from a DDRM, enabling a reading of identification information of the digital data.

16. The method of claim 13, wherein enabling a user to receive digital data comprises enabling a user to receive digital data via the Internet.

17. The method of claim 13, wherein the digital data comprises audio data, and wherein enabling the digital data to be played comprises enabling the digital data to be played as audio.

18. The method of claim 14, wherein preventing copying of the digital data comprises informing a user that the digital data may not be copied.

19. The method of claim 14, wherein enabling copying of the digital data onto the authorized recording medium comprises enabling a marking of the authorized recording medium with the digital data recorded thereon as a second generation.

20. The method of claim 14, further comprising enabling an updating of watermark and tag information of the digital data.

21. The method of claim 14, wherein enabling a determination to be made as to whether the digital data is to be copied or ripped comprises the steps of:
  if the digital data is to be ripped, enabling a marking of the digital data as a home copy; and
  enabling a reading of identification information of the digital data.

22. The method of claim 15, wherein identification information is selected from at least one of the group consisting of: watermark information, tag information and encryption information.

23. The method of claim 15, wherein enabling a reading of identification information comprises:
  enabling a determination to be made as to whether the identification information is provided in an appropriate format;
  if the identification information is not in an appropriate format, enabling a marking of the digital data as a home copy;
  if the identification information is in an appropriate format, enabling placement of a tag and watermark in a database.

24. The method of claim 21, wherein an appropriate format is SDMI format, and wherein enabling a marking of the digital data as a home copy comprises enabling conversion of a rip tag file of the digital data to SDMI format.

25. A device for restricting use of digital data by a user, said device comprising:
  a first input configured to receive digital data;
  a second input configured to receive inputs from a user; and
  a recording media interface component configured to communicate with a digital recording medium,
  said recording media interface electrically communicating with said first input and said second input and being adapted to write data to a digital recording medium;
  said device being configured to determine whether digital data received via said first input is from a digital data recording medium (DDRM) and, if the digital data is from a DDRM, to determine whether the DDRM is a second generation DDRM, which includes digital data copied from at least one of an original source and an authorized copy of such digital data, such that, if the DDRM is a second generation DDRM and the digital data is to be played, said device plays the digital data in response to an associated input provided via said second input from the user, and if the DDRM is a second generation DDRM and the digital data is to be copied, said device determines whether an authorized recording medium, for which copying digital data thereto has been approved, is provided for copying the digital data thereon, prevents copying of the digital data if an authorized recording medium is not provided, and, if an authorized recording medium is provided, copies the digital data onto the authorized recording medium.

26. The device of claim 25, further comprising:
  a third input electrically communicating with said recording media interface and configured to receive analog data.

27. The device of claim 25, further comprising:
  logic circuitry configured to determine whether digital data received via said first input is from a DDRM and, if the digital data is from a DDRM, to determine whether the DDRM is a second generation DDRM such that, if the DDRM is a second generation DDRM, said device plays the digital data in response to an associated input provided via said second input from the user, said logic circuitry electrically communicating with said recording media interface.

28. A device for restricting use of digital data by a user, said device comprising:
  means for receiving digital data;
  means for receiving inputs from a user;
  means for writing data to a digital recording medium;
  means for determining whether digital data received via said means for receiving digital data is from a digital data recording medium (DDRM); and
  means for determining whether the DDRM is a second generation DDRM, which includes digital data copied from at least one of an original source and an authorized copy of such digital data such that, if the DDRM is a second generation DDRM and the digital data is to be played, said device plays the digital data in response to an associated input provided via said means for receiving inputs from a user from the user, and, if the DDRM is a second generation DDRM and the digital data is to be copied, said device determines whether an authorized recording medium, for which copying digital data thereto has been approved, is provided for copying the digital data thereon, prevents copying of the digital data if an authorized recording medium is not provided, and, if an authorized recording medium is provided, enables copying of the digital data onto the authorized recording medium.

29. The device of claim 28, further comprising:
  means for receiving analog data.

30. A system for restricting use of digital data by a user, said system comprising:
  a first input configured to receive digital data;
  a memory storage device communicating with said first input, said memory storage device being configured to receive and store the digital data;
  a processor communicating with said first input and configured to determine whether the digital data received via said first input is from a digital data recording medium (DDRM) and, if the digital data is from a DDRM, to determine whether the DDRM is a second generation DDRM, which includes digital data copied from at least one of an original source and an authorized copy of such digital data;
  a second input configured to receive inputs from a user; and
  a recording media interface configured to communicate with a digital recording medium such that said recording media interface is configured to write data to the digital recording medium communicating therewith, said recording media interface communicating with said processor such that if it is determined that the digital data received via said first input is from a DDRM and that the DDRM is a second generation DDRM and the digital data is to be played, said system enables playing of the digital data in response to an associated input provided via said second input from the user, and, if the DDRM is a second generation DDRM and the digital data is to be copied, said system determines whether an authorized recording medium, for which copying digital data thereto has been approved, is provided for copying the digital data thereon such that, if an authorized recording medium is not provided, said system prevents copying of the digital data, and, if an authorized recording medium is provided, said system enables copying of the digital data onto the authorized recording medium.

31. The system of claim 30, wherein said processor is configured to determine whether an authorized recording medium is communicating with said recording media interface.

32. A computer readable medium having a computer program stored therein for interfacing with a processor-based system, the processor-based system being configured to receive digital data, said computer readable medium comprising:
- logic configured to determine whether the digital data is being received from a digital data recording medium (DDRM);
- logic configured to determine whether the DDRM is a second generation DDRM, which includes digital data copied from at least one of an original source and an authorized copy of such digital data; and
- logic configured to enable playing of the digital data if the digital data is being received from a second generation DDRM, and, if the DDRM is a second generation DDRM and the digital data is to be copied, said device determines whether an authorized recording medium, for which copying digital data thereto has been approved, is provided for copying the digital data thereon, prevents copying of the digital data if an authorized recording medium is not provided, and enables copying of the digital data onto the authorized recording medium if an authorized recording medium is provided.

33. The computer readable medium of claim 32, wherein said logic configured to determine whether the digital data is being received from a DDRM comprises:
- a first logic code segment for enabling a reading of identification information of the digital data.

34. The computer readable medium of claim 32, wherein said logic configured to determine whether the digital data is being received from a DDRM comprises:
- a second logic code segment configured to determine whether the digital data is to be copied;
- a third logic code segment configured to determine whether an authorized recording medium is provided for copying the digital data thereon; and
- a fourth logic code segment configured to prevent copying of the digital data if an authorized recording medium is not provided.

35. The method of claim 1, wherein the royalty associated with the authorized recording medium is paid via a web site.

36. The method of claim 13, wherein the royalty associated with the authorized recording medium is paid via a web site.

37. The method of claim 1, wherein the authorized recording medium is a Secondary Copy Management System (SCMS) medium.

38. The method of claim 13, wherein the authorized recording medium is a Secondary Copy Management System (SCMS) medium.

39. The system of claim 25, wherein the authorized recording medium is a Secondary Copy Management System (SCMS) medium.

40. The system of claim 28, wherein the authorized recording medium is a Secondary Copy Management System (SCMS) medium.

41. The system of claim 30, wherein the authorized recording medium is a Secondary Copy Management System (SCMS) medium.

42. The system of claim 32, wherein the authorized recording medium is a Secondary Copy Management System (SCMS) medium.

* * * * *